United States Patent
Subbiah et al.

(10) Patent No.: US 10,404,620 B2
(45) Date of Patent: Sep. 3, 2019

(54) MULTICAST REGISTERED STATE CHANGE NOTIFICATION SYSTEM

(71) Applicant: Dell Products L.P., Round Rock, TX (US)

(72) Inventors: Ramesh Kumar Subbiah, Tamil Nadu (IN); Saravanan Obulisami, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/852,617

(22) Filed: Dec. 22, 2017

(65) Prior Publication Data

US 2019/0199652 A1    Jun. 27, 2019

(51) Int. Cl.
*H04L 12/931* (2013.01)
*H04L 29/12* (2006.01)

(52) U.S. Cl.
CPC .......... *H04L 49/201* (2013.01); *H04L 49/357* (2013.01); *H04L 61/6045* (2013.01)

(58) Field of Classification Search
None
See application file for complete search history.

(56) References Cited

U.S. PATENT DOCUMENTS

| 7,930,583 B1* | 4/2011 | Vemuri | G06F 11/0727 709/223 |
| 2006/0133376 A1* | 6/2006 | Valdevit | H04L 41/024 370/390 |
| 2006/0171330 A1* | 8/2006 | Mandrell | H04L 49/357 370/254 |

* cited by examiner

*Primary Examiner* — Anh Ngoc M Nguyen
(74) *Attorney, Agent, or Firm* — Haynes and Boone, LLP

(57) ABSTRACT

A registered state change notification system includes a switch device that is coupled to a plurality of end devices to provide a fabric. An application executing on the switch device detects a change that is associated with a zone in the fabric that includes a plurality of end devices and, in response, generates a multicast Registered State Change Notification (RSCN) that includes a Zone Fiber Channel Identifier (FCID) that is associated with the zone. Subsequently and without the use of the application, multicast hardware included in the switch device sends the multicast RSCN including the Zone FCID to at least a subset of the plurality of end devices.

20 Claims, 6 Drawing Sheets

MULTICAST REGISTERED STATE CHANGE NOTIFICATION SYSTEM

BACKGROUND

The present disclosure relates generally to information handling systems, and more particularly to providing multicast registered state change notifications to information handling systems in a Fibre Channel fabric.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided in fabrics. For example, conventional FC fabrics may include switch devices that connect FC end devices that communicate via FC communications, and/or FC over Ethernet (FCoE) end devices that communicate via FCoE communications. The end devices in the fabric may register to be notified of state changes in the fabric via Registered State Change Notifications (RSCNs), and when a management application in a switch device detects a state change in the fabric (e.g., a change to one of the end devices), that management application operates to generate and send a unicast RSCN to each end device that is registered to receive such RSCNs. The generation and sending of unicast RSCNs can raise a number of issues, as the management applications in the switch devices must queue and send a separate unicast RSCN to each end device in the fabric that is registered to receive one when a fabric change is detected, which greatly increases the traffic that must be generated and sent by those management applications.

Accordingly, it would be desirable to provide an improved RSCN system.

SUMMARY

According to one embodiment, an Information Handling System (IHS) includes multicast hardware; a processing system coupled to the multicast hardware; and a memory system that is coupled to the processing system and that includes instructions that, when executed by the processing system, cause the processing system to provide a registered state change notification engine that is configured to: detect a change that is associated with a zone in a fabric that includes a plurality of end devices; and generate, in response to detecting the change that is associated with the zone in the fabric, a multicast Registered State Change Notification (RSCN) that includes a Zone Fibre Channel Identifier (FCID) that is associated with the zone, wherein the multicast hardware is configured to send the multicast RSCN including the Zone FCID to at least a subset of the plurality of end devices.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
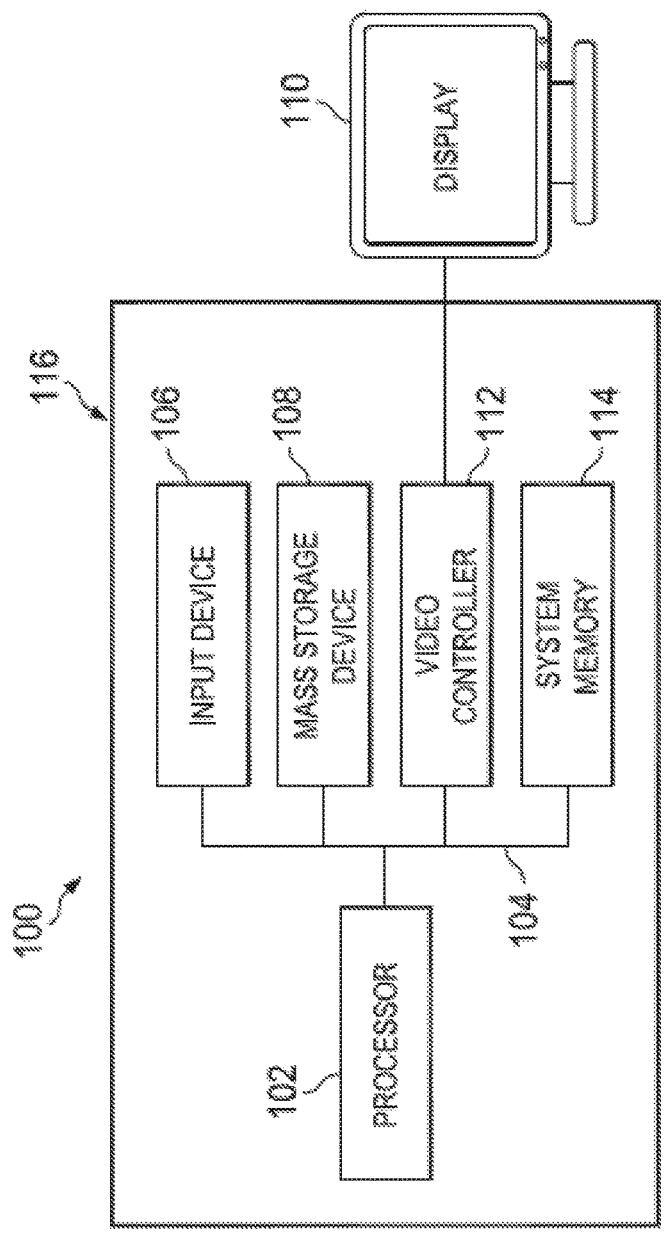
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
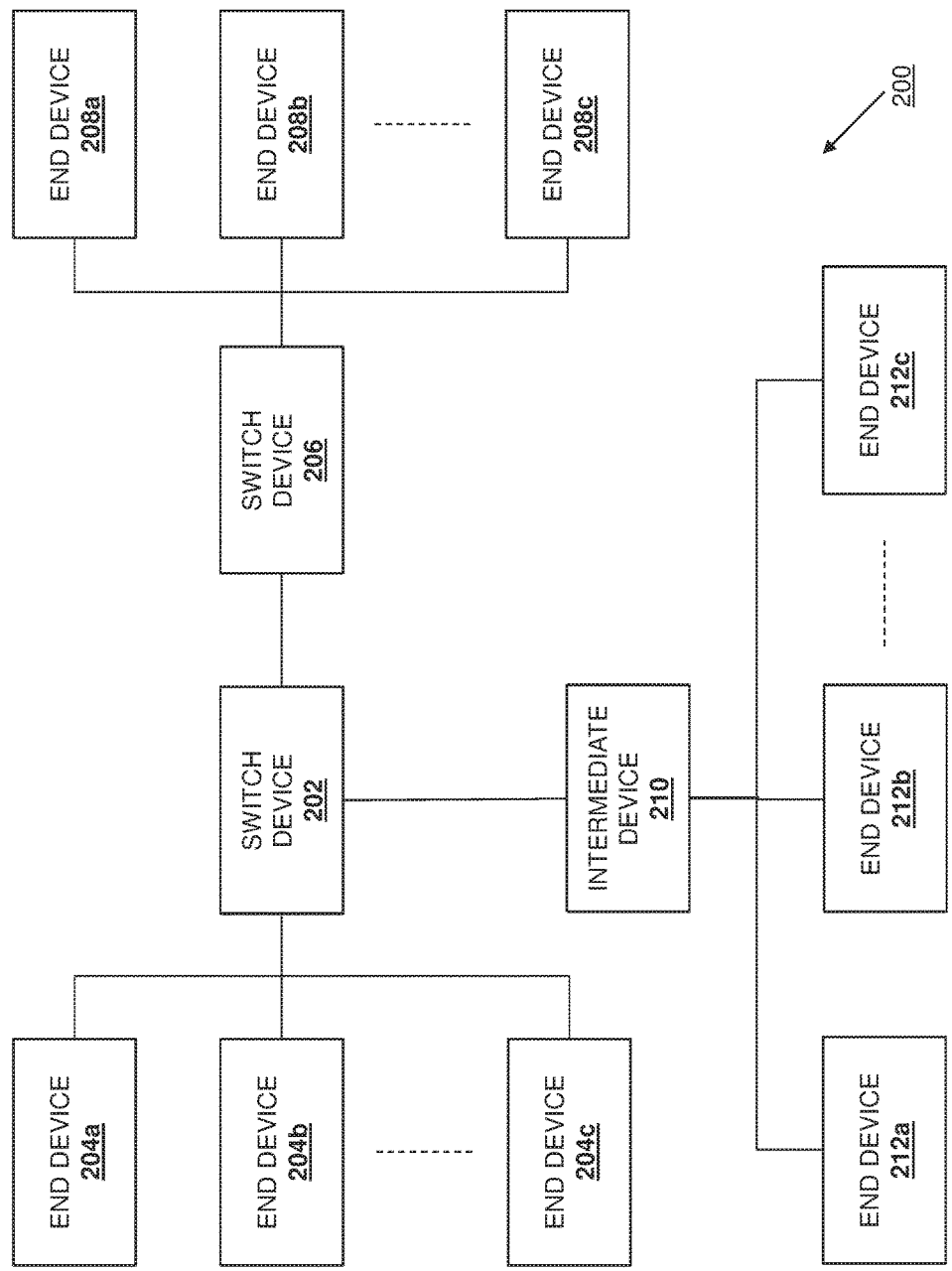
FIG. 2 is a schematic view illustrating an embodiment of a fabric.

Referring now to FIG. 2, an embodiment of a fabric 200 is illustrated. In the illustrated embodiment, the fabric 202 includes a switch device 202 which may be provided by the IHS 100 discussed above with reference to FIG. 1, and/or which may include some or all of the components of the IHS 100. In different embodiments discussed below, the switch device 202 may be an FC switch device or an FC over Ethernet (FCoE) switch device, and may act as a Fibre Channel Forwarder (FCF) device, although other types of switch devices may fall within the scope of the present disclosure as well. The switch device 202 is coupled to a plurality of end devices 204a, 204b, and up to 204c, any or all of which may be provided by the IHS 100 discussed above with reference to FIG. 1, and/or may include some or all of the components of the IHS 100. As discussed below, any of the end devices 204a-c may be FC end devices or FCoE end devices. In the specific examples provided below, the switch device 202 operates to detect a change associated with a zone in the fabric 200, generate a multicast Registered State Change Notification (RSCN), and cause that multicast RSCN to be provided to any end devices in the fabric that are included in that zone.

The fabric 202 also includes a switch device 206 which may be provided by the IHS 100 discussed above with reference to FIG. 1, and/or which may include some or all of the components of the IHS 100. In different embodiments discussed below, the switch device 206 may be an FC switch device or an FC over Ethernet (FCoE) switch device, and may act as an FCF device, although other types of switch devices may fall within the scope of the present disclosure as well. The switch device 206 is coupled to a plurality of end devices 208a, 208b, and up to 208c, any or all of which may be provided by the IHS 100 discussed above with reference to FIG. 1, and/or may include some or all of the components of the IHS 100. As discussed below, any of the end devices 208a-c may be FC end devices or FCoE end devices. In the specific examples provided below, the switch device 206 operates to receive a multicast RSCN from the switch device 202 (e.g., sent by the switch device in response to detecting a change associated with a zone in the fabric 200) and provide the multicast RSCN to any of the end devices 208a-c that are included in the zone in which the change was detected.

The fabric 202 also includes an intermediate device 210 which may be provided by the IHS 100 discussed above with reference to FIG. 1, and/or which may include some or all of the components of the IHS 100. In the embodiments discussed below, the intermediate device 210 is an FC over Ethernet (FCoE) switch device, and may act as an FCoE Initialization Protocol (FIP) Snooping Bridge (FSB) device, although other types of switch devices may fall within the scope of the present disclosure as well. The intermediate device 210 is coupled to a plurality of end devices 212a, 212b, and up to 212c, any or all of which may be provided by the IHS 100 discussed above with reference to FIG. 1, and/or may include some or all of the components of the IHS 100. As discussed below, each of the end devices 212a-c may be FCoE end devices. In the specific examples provided below, the intermediate device 210 operates to receive a multicast RSCN from the switch device 202 (e.g., sent by the switch device in response to detecting a change associated with a zone in the FC fabric 200) and provide the multicast RSCN to any of the end devices 212a-c that are included in the zone in which the change was detected. While a specific example of a fabric has been described, one of skill in the art in possession of the present disclosure will recognize that FC fabrics may include a variety of devices in a variety of configurations that will fall within the scope of the present disclosure as well.

Figure 3:
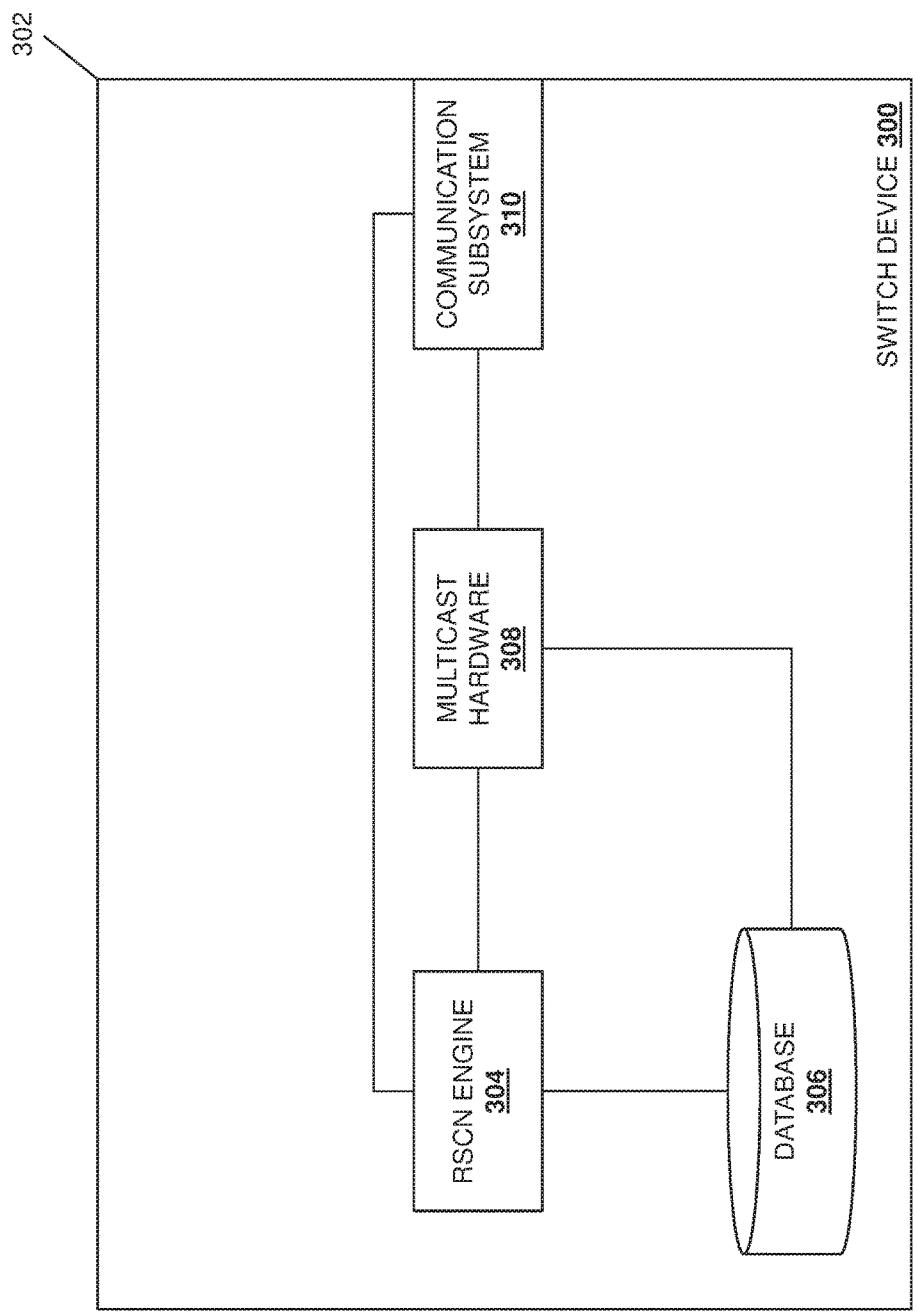
FIG. 3 is a schematic via illustrating an embodiment of a switch device used in the fabric of FIG. 2.

Referring now to FIG. 3, an embodiment of a switch device 300 is illustrated that may be either or both of the switch devices 202 and 206 discussed above with reference to FIG. 2. As such, the switch device 300 may be provided by the IHS 100 discussed above with reference to FIG. 1, and/or which may include some or all of the components of the IHS 100, and in specific embodiments may act as an FCF device. In the illustrated embodiment, the switch device 300 includes a chassis 302 that houses the components of the switch device 300, only some of which are illustrated for clarity. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a Registered State Change Notification (RSCN) engine 304 that is configured to perform the functions of the RSCN engines and switch devices discussed below. In some of the examples below, the RSCN engine 304 provides an application such as, for example, a management application that performs the FC, FCoE, and/or RSCN functionality discussed below, although other functionality provided by the RSCN engine is envisioned as falling within the scope of the present disclosure.

The chassis 302 may also house a storage system (not illustrated, but which may include the storage device 108 discussed above with reference to FIG. 1) that is coupled to the RSCN engine 304 (e.g., via a coupling between the storage system and the processing system) and that includes a database 306 that is configured to store the information utilized to provide the functionality discussed below. The chassis 302 may also house multicast hardware 308 that is coupled to the RSCN engine 304 (e.g., via a coupling between the multicast hardware 308 and the processing system) and the database 306 (e.g., via a coupling between the multicast hardware 308 and the storage system), and that is configured to replicate and send the multicast RSCNs as discussed below. For example, the multicast hardware may include a forwarding table that is configured to be used to replicate frames to multiple ports in a switch device connected to multiple end device in a zone, as well as components that are configured to perform the replication of originated or received multicast RSCN frames (FC or FCoE) as FC frames to FC ports and as FCoE frames to FCoE ports, and/or a variety of other hardware that one of skill in the art would recognize may be used to replicate and send the multicast RSCNs as discussed below.

The chassis 302 may also house a communication subsystem 310 that is coupled to the each of the RSCN engine 304 (e.g., via a coupling between the communication subsystem 310 and the processing system) and the multicast hardware 308, and that may include a Network Interface Controller (NIC), a wireless communication subsystem (e.g., a BLUETOOTH® communication subsystem, a Near Field Communication (NFC) subsystem, a WiFi communication subsystem, and/or other wireless communications subsystems known in the art), and/or other communication components that would be apparent to one of skill in the art in possession of the present disclosure. While a specific switch device 300 has been illustrated, one of skill in the art in possession of the present disclosure will recognize that switch devices may include a variety of other components and/or component configurations for providing conventional switch functionality, as well as the functionality discussed below, while remaining within the scope of the present disclosure.

Figure 4:
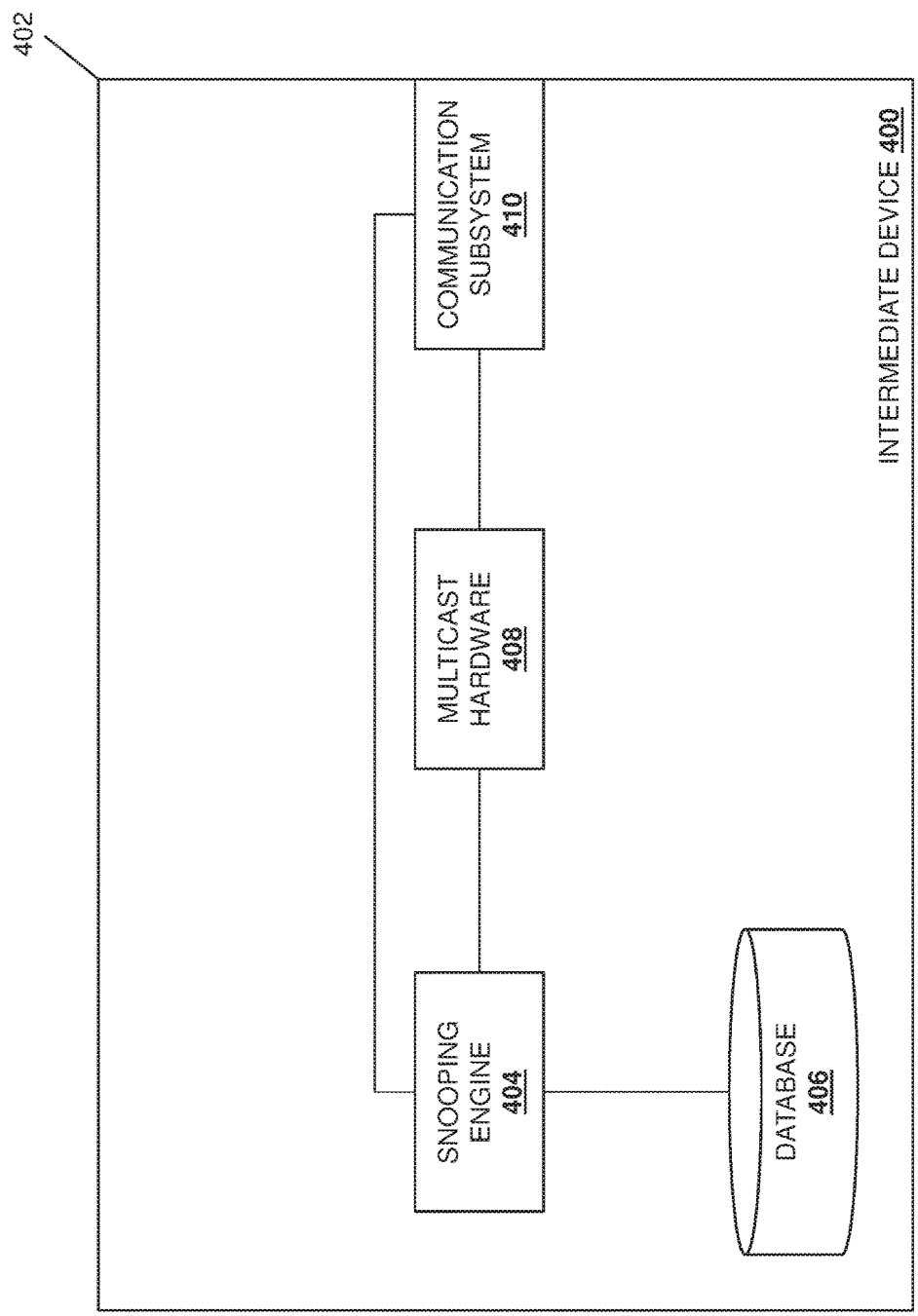
FIG. 4 is a schematic via illustrating an embodiment of an intermediate device used in the fabric of FIG. 2.

Referring now to FIG. 4, an embodiment of an intermediate device 400 is illustrated that may be the intermediate device 210 discussed above with reference to FIG. 2. As such, the intermediate device 400 may be provided by the IHS 100 discussed above with reference to FIG. 1, and/or which may include some or all of the components of the IHS 100, and in specific embodiments may act as an FSB device. In the illustrated embodiment, the intermediate device 400 includes a chassis 402 that houses the components of the intermediate device 400, only some of which are illustrated for clarity. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a snooping engine 404 that is configured to perform the functions of the snooping engines and switch devices discussed below. In some of the examples below, the snooping engine 404 provides an application such as, for example, a management application that performs the snooping functionality discussed below, although other functionality provided by the snooping engine is envisioned as falling within the scope of the present disclosure.

The chassis 402 may also house a storage system (not illustrated, but which may include the storage device 108 discussed above with reference to FIG. 1) that is coupled to the snooping engine 404 (e.g., via a coupling between the storage system and the processing system) and that includes a database 406 that is configured to store the information utilized to provide the functionality discussed below. The chassis 402 may also house multicast hardware 408 that is coupled to the snooping engine 404 (e.g., via a coupling between the multicast hardware 408 and the processing system) and the database 406 (e.g., via a coupling between the multicast hardware 408 and the storage system), and that is configured to send the multicast RSCNs as discussed below. For example, the multicast hardware may include the multicast hardware may include a forwarding table that is configured to be used to replicate frames to multiple ports in a switch device connected to multiple end device in a zone, as well as components that are configured to perform the replication of originated or received multicast RSCN frames (FCoE) as FCoE frames to FCoE ports based on the ESCN database 406 generated by the snooping of the FIP frames discussed above, and/or a variety of other hardware that one of skill in the art would recognize may be used to send the multicast RSCNs as discussed below.

The chassis 402 may also house a communication subsystem 410 that is coupled to the each of the snooping engine 404 (e.g., via a coupling between the communication subsystem 410 and the processing system) and the multicast hardware 408, and that may include a Network Interface Controller (NIC), a wireless communication subsystem (e.g., a BLUETOOTH® communication subsystem, a Near Field Communication (NFC) subsystem, a WiFi communication subsystem, and/or other wireless communications subsystems known in the art), and/or other communication components that would be apparent to one of skill in the art in possession of the present disclosure. While a specific intermediate device 400 has been illustrated, one of skill in the art in possession of the present disclosure will recognize that intermediate devices may include a variety of other components and/or component configurations for providing conventional intermediate device functionality, as well as the functionality discussed below, while remaining within the scope of the present disclosure.

Figure 5:
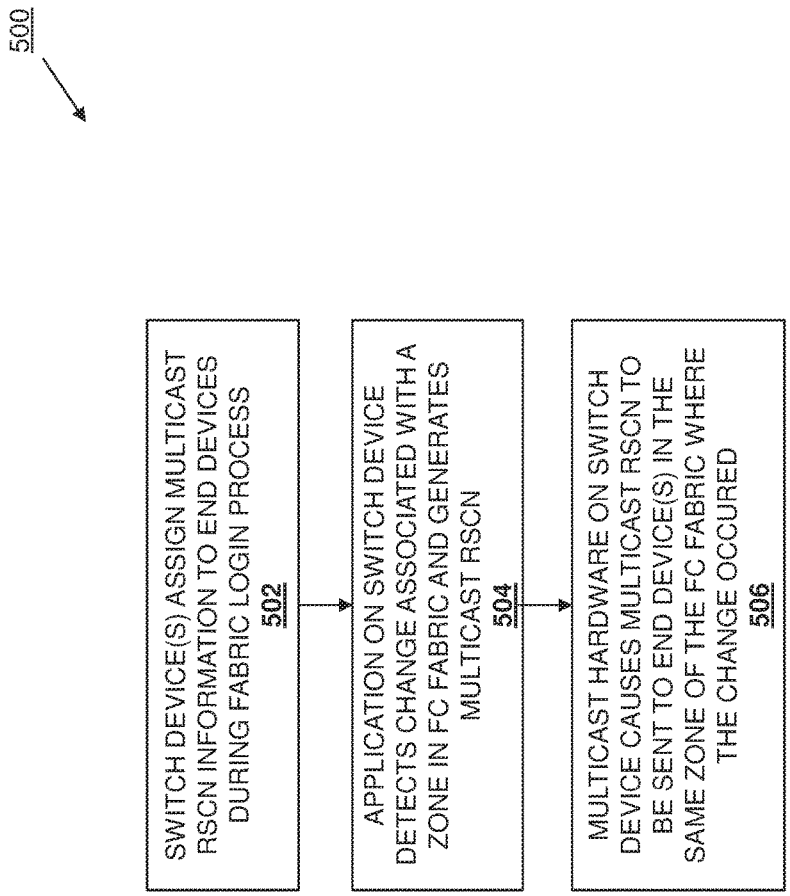
FIG. 5 is a flow chart illustrating an embodiment of a method for providing multicast Registered State Change Notifications (RSCNs).

Referring now to FIG. 5, an embodiment of a method 500 for providing multicast registered state change notifications is illustrated. As discussed below, the systems and methods of the present disclosure provide for multicast Registered State Change Notifications (RSCNs) using "zone-based multicasting" that is provided via an application on a FCF device that generates a multicast RSCN as a single frame in response to detecting a change associated with a zone in a fabric, and having multicast hardware in that FCF device replicate that multicast RSCN in packets that may be sent to each of the other end devices in that zone. As would be appreciated by one of skill in the art in possession of the present disclosure, the provisioning of such multicast RSCNs reduces the number of packets that must be generated and sent by the application in the FCF device. Furthermore, other devices in the fabric may be configured to perform similar functionality. For example, intermediate FCF devices that receive a multicast RSCN from an originating FCF device, and may be configured to replicate that multicast RSCN and send it to its connected device in order to reduce the traffic sent through the fabric (i.e., such that the originating FCF device is not required to send a multicast RSCN for each device connected to those intermediate FCF devices.) Further still, FSB devices may include tables that detail how a single multicast RSCN received from the originating FCF device may be replicated and sent through its ports to connected end devices.

The method 500 begins at block 502 where switch device (s) assign multicast registered state change notification information to end devices during their fabric login processes. In an embodiment, at block 502, each end device in the fabric 200 may perform a fabric login process with the switch device(s). One of skill in the art in possession of the present disclosure will recognize that conventional fabric login processes are performed by end devices to detect the fabric 200, exchange service parameters with a fabric controller (i.e., the switch device(s)) and, if the fabric login process is successful, receive back an address that allows that end device to communicate with other devices in the fabric 200. As such, the conventional details of the fabric login process are not repeated here. However, in addition to such conventional fabric login operations, at block 502, the fabric controller may determine FC device(s) and/or FCoE device(s) that are part of the same zone, and then operate to assign a unique Zone FCID to each of those FC devices in that zone, and assign that unique Zone FCID and a unique Multicast MAC address to each of those FCoE device(s) in that zone. The example below describes the operation of a single switch device assigning Zone FCIDs and/or Multicast MAC addresses/Zone FCIDs to groups of end devices that are part of two different zones, but one of skill in the art in possession of the present disclosure will recognize that the operations discussed below may be performed by any number of switch devices in a fabric with any number of end devices that are part of any number of zones while remaining within the scope of the present disclosure.

Figure 6:
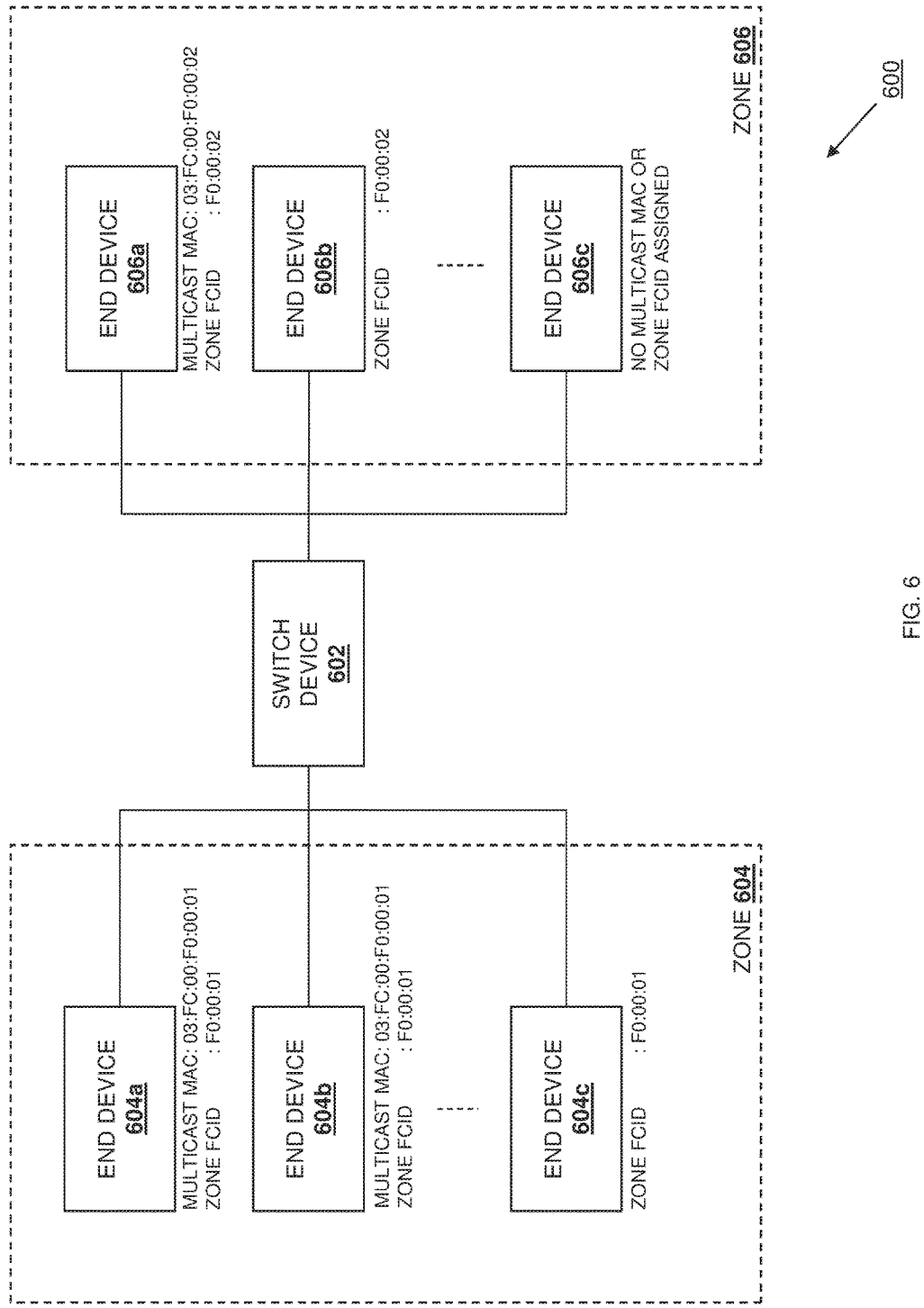
FIG. 6 is a schematic illustrating an embodiment of a fabric with multicast RSCN information assigned to end devices in different zones.

With reference to FIG. 6, a fabric 600 that may be a portion of the fabric 200 discussed above with reference to FIG. 2 is illustrated. The fabric includes a switch device 602 that is coupled to a plurality of end devices that are part of different zones 604 and 606, with end devices 604a, 604b, and up to 604c included in the zone 604, and end devices 606a, 606b, and up to 606c included in the zone 606. As would be understood by one of skill in the art, the zones 604 and 606 may be defined by a network administrator or other user by providing zone information to the switch device 602 (e.g., the user defining zones that include any subset of the end devices in the fabric.) As such, at or prior to block 502, the RSCN engine 304 in the switch device 300/602 may receive the zone information from the network administrator (e.g., via the communication subsystem) and store that zone information in the database 306. In some embodiments, during the fabric login process for any end device, the RSCN engine 304 may operate to determine the RSCN multicast capabilities of that end device (e.g., to determine whether that end device is programmed to recognize the Zone FCIDs and/or Multicast MAC addresses as discussed below) and, if the end device is multicast RSCN capable, assign the Zone FCID and/or Multicast MAC address to that end device at block 302. In the event the end device is not multicast RSCN capable, the RSCN engine 304 may be configured to note that lack of capability and, as detailed below, subsequently utilize conventional RSCN communications (i.e., unicast RSCNs) with that end device. In addition, switch devices (e.g., the switch device 202) may be configured to determine whether other devices in the fabric 200 (e.g., the switch device 206 and the intermediate device 210) are multicast-RSCN-capable in a similar manner.

At block 302 and during the fabric login process, the switch device 602 then determines end devices that are part of the same zone, assigns a unique Zone FCIDs to the FC devices in that zone, assigns a unique Multicast MAC address and the unique Zone FCIDs to the FCoE devices in that zone, and/or identifies the FC devices and/or FCoE devices in that zone that are not multicast RSCN capable. One of skill in the art in possession of the present disclosure will recognize that the Zone FCIDs and/or Multicast MAC addresses discussed below may be provided in a database (e.g., the database 306) that may be accessed (e.g., by the RSCN engine 304) to retrieve and assign those Zone FCIDs and/or Multicast MAC addresses to end devices during their fabric login processes at block 302, and/or the Zone FCIDs and/or Multicast MAC addresses may be dynamically generated (e.g., by the RSCN engine 304) and assigned to end devices during their fabric login process at block 302, while remaining within the scope of the present disclosure. While not discussed in detail below, one of skill in the art in possession of the present disclosure will recognize that end devices in the fabric 200/600 may be included in more than one zone and, for such end devices, the switch device 602 may assign those end devices a unique Zone FCID and/or a unique Multicast MAC address for each zone that includes that end device.

In some examples, Zone FCIDs assigned at block 302 may include a 3 octet address that utilizes a non-reserved FC address element in the first octet in order to avoid any other FCID assignments utilized in the fabric 200/600. For example, there are currently 239 reserved FC address elements, ending with the address element "EF". As such, in the specific examples provided below, the Zone FCIDs begin with "F0", the non-reserved $240^{th}$ FC address element, although one of skill in the art in possession of the present disclosure will recognize that other non-reserved elements may be utilized for FCIDs while remaining within the scope of the present disclosure. Furthermore, in some examples, the second octet and the third octet of the Zone FCID may be utilized to indicate which zone the end device belongs. As such, in the specific examples provided below, the Zone FCID for end devices in a first zone may be "F0:00:01", the Zone FCID for end devices in a second zone may be "F0:00:02", and so on.

In some examples, Multicast MAC addresses assigned at block 302 may include a 6 octet address that utilizes the first 3 octets to indicate that the MAC address is a multicast address, and includes the Zone FCID discussed above in the second 3 octets. In the specific examples provided below, the first octet of the Multicast MAC address is "03" to indicate that the MAC address is a multicast address, as "01" is currently used for other multicast communications. However, as would be understood by one of skill in the art in the present disclosure, other odd numbers ("05", "07", and so on) may be utilized in the first octet of the Multicast MAC address while remaining within the scope of the present disclosure. Furthermore, in some examples, the second octet and/or the third octet of the Multicast MAC address may be used to indicate what the address is being used for (e.g., Fiber Channel communications, or "FC:00" in this example), although one of skill in the art in possession of the present disclosure will appreciate that the second octet and third octet of the Multicast MAC address may vary while remaining within the scope of the present disclosure. As such, in the specific examples provided below, the Multicast MAC address for end devices in the first zone (discussed in the Zone FCID example above) may be "03:FC:00:F0:00:01", the Multicast MAC address for end devices in the second zone (discussed in the specific Zone FCID example above) may be "03:FC:00:F0:00:02", and so on.

Thus, with reference to FIG. 6, at block 302 the RSCN engine 304 in the switch device 300/602 has performed a fabric login process with the end device 604a that is an FCoE device in this example, determined that the end device 604a is multicast RSCN capable, determined that the end device 604a is part of zone 604 and, in response, has assigned the end device 604a a Zone FCID "F0:00:01" and a Multicast MAC address "03:FC:00:F0:00:01", which may then be stored in the database 306. Similarly, at block 302 the RSCN engine 304 in the switch device 300/602 has performed a fabric login process with the end device 604b that is an FCoE device in this example, determined that the end device 604b is multicast RSCN capable, determined that the end device 604b is part of zone 604 and, in response, has assigned the end device 604b the Zone FCID "F0:00:01" and the Multicast MAC address "03:FC:00:F0:00:01", which may then be stored in the database 306. Similarly, at block 302 the RSCN engine 304 in the switch device 300/602 has performed a fabric login process with the end device 604c that is an FC device in this example, determined that the end device 604c is multicast RSCN capable, determined that the end device 604c is part of zone 604 and, in response, has assigned the end device 604c the Zone FCID "F0:00:01", which may then be stored in the database 306.

Similarly, at block 302 the RSCN engine 304 in the switch device 300/602 has performed a fabric login process with the end device 606a that is an FCoE device in this example, determined that the end device 606a is multicast RSCN capable, determined that the end device 606a is part of zone 606 and, in response, has assigned the end device 606a a Zone FCID "F0:00:02" and a Multicast MAC address"03:FC:00:F0:00:02", which may then be stored in the database 306. Similarly, at block 302 the RSCN engine 304 in the switch device 300/602 has performed a fabric login process with the end device 606b that is an FC device in this example, determined that the end device 606b is multicast RSCN capable, determined that the end device 606b is part of zone 606 and, in response, has assigned the end device 606b the Zone FCID "F0:00:01", which may then be stored in the database 306. Similarly, at block 302 the RSCN engine 304 in the switch device 300/602 has performed a fabric login process with the end device 606c that may be either an FC device or FCoE device in this example, and determined that the end device 606c is not multicast RSCN capable, which may then be noted in the database 306. While a specific examples of the assignment of multicast RSCN information to end devices has been described, one of skill in the art in possession of the present disclosure will recognize that multicast RSCN information may take a variety of forms and be assigned in a variety of manners that will provide for the functionality discussed below while remaining within the scope of the present disclosure.

The method 500 then proceeds to block 504 where an application on the switch device detects a change associated with a zone in the Fibre Channel fabric and generates a multicast registered state change notification. In an embodiment, at block 504, a change may occur in a zone defined in the fabric 200, and that change may be detected by the RSCN engine 304 in the switch device 300. For example, change in the fabric 200 may include end devices joining and/or leaving a zone in the fabric, switch devices joining and/or leaving a zone in the fabric, changes to names of switch devices in zones of the fabric, and/or a variety of other FC fabric changes that would be apparent to one of skill in the art in possession of the present disclosure. In the specific examples provided below, the RSCN engine 304 in the switch device 300/600 of FIG. 6 may detect any of the end devices 604a-c in the zone 604 leaving the fabric 600 (or an end device joining the zone 604 of the fabric 600), and detect any of the end devices 606a-c in the zone 606 leaving the fabric 600 (or an end device joining the zone 606 of the fabric 600). However, one of skill in the art in possession of the present disclosure will recognize that any of a variety of changes may occur in the fabric 600 and result in the creation of the multicast RSCN at block 504 while remaining within the scope of the present disclosure.

In an embodiment, the multicast RSCN may be generated by an application in the switch device 300 (e.g., a management application provided by the RSCN engine 304) at block 506, and may include a single frame having information about the change that occurred in the fabric 600. For example, that single frame may include details about the list of effected devices in the zone that experienced the change, and/or a variety of other RSCN data that would be apparent to one of skill in the art in possession of the present disclosure. While a particular multicast RSCN has been described, one of skill in the art in possession of the present disclosure will recognize that the multicast RSCN may include a variety of information in a variety of formats that will fall within the scope of the present disclosure as well.

The method 500 then proceeds to block 506 where multicast hardware on the switch device causes the multicast registered state change notification to be sent to end device (s) in the same zone of the Fibre Channel fabric where the change occurred. In an embodiment, at or before block 504, end devices may register for RSCNs. For example, at or before block 506, the RSCN engine 304 in the switch device 300 may receive State Change Notification (SCN) registrations through the communication subsystem 310 from any of the end devices in the fabric 200, may store those SCN registrations in the database 306, and may program the multicast hardware 308 based on the Multicast MAC addresses and/or Zone FCID assignments made to the registered end devices that are part of particular zone(s). In some embodiments of block 506, the RSCN engine 304 may use the zone in which the change was detected at block 504 to access the database 306 to identify end device(s) in that zone that are registered for RSCNs. The RSCN engine 304 may then provide the multicast hardware 308 the multicast RSCN created at block 504, along with the identity of the end devices that are included in the zone that experienced the change and that are registered for RSCNs. In other embodiments, the multicast hardware 308 may use the zone in which the change was detected at block 504 to access the database 306 to identify end device(s) in that zone that are registered for RSCNs.

At block 506, the multicast hardware 308 may use the identities of the end devices received from the RSCN engine 304 to determine if any of those end devices are FC devices. For end devices that are FC devices, the multicast hardware may replicate the multicast RSCN by generating an FC communication that includes the multicast RSCN received from the RSCN engine 304, retrieve the Zone FCID for the zone that experienced the change at block 504 from the database 306, include that Zone FCID in the FC communication header of that FC communication, and send that FC communication to that FC device through the communication subsystem 310. Similarly, at block 506, the multicast hardware 308 may use the identities of the end devices received from the RSCN engine 304 to determine if any of those end devices are FCoE devices. For end devices that are FCoE devices, the multicast hardware may replicate the multicast RSCN by generating an FC communication that includes the multicast RSCN received from the RSCN engine 304, retrieve the Zone FCID for the zone that experienced the change at block 504 from the database 306, include that Zone FCID in an FC communication header of that FC communication, encapsulate that FC communication in an FCoE communication, include the Multicast MAC address in an Ethernet header of that FCoE communication, and send that FCoE communication to that FCoE device through the communication subsystem 310. At block 506, the RSCN engine 304 (e.g., an application such as a management application provided by the RSCN engine 304) may use the identities of the end devices to determine if any of those end devices are non-multicast-compatible end devices. For end devices that are non-multicast-compatible end devices, the RSCN engine 304 may generate conventional unicast RSCNs and send those conventional unicast RSCNs to each of the non-multicast-compatible end devices through the communication subsystem 310. While specific examples of the replication of multicast RSCNs has been described, other replication techniques will fall within the scope of the present disclosure as well.

With reference back to FIG. 6, in response to a change associated with the zone 604 in the fabric 600, multicast RSCNs may be sent by the multicast hardware in the switch device 602 to each of the end devices 604a-c that are registered to receive them by generating the FCoE communications discussed above that include the Multicast MAC address "03:FC:00:F0:00:01" (and the Zone FCID "F0:00:01" in the encapsulated FC communications) and sending them to the end devices 604*a* and 604*b*, and generating the FC communications discussed above that include the Zone FCID "F0:00:01" and sending them to the end device 604*c*. Similarly, in response to a change associated with the zone 606 in the fabric 600, multicast RSCNs may be sent by the multicast hardware in the switch device 602 to each of the end devices 606*a* and 606*b* that are registered to receive them by generating the FCoE communications discussed above that include the Multicast MAC address "03:FC:00:F0:00:02" (and the Zone FCID "F0:00:02" in the encapsulated FC communications) and sending them to the end device 606, generating the FC communications discussed above that include the Zone FCID "F0:00:02" and sending them to the end device 604*b*, while conventional unicast RSCNS may be generated and sent by the RSCN engine 304/application to the end device 606*c*.

With reference back to FIG. 2, in some embodiments, switch devices in the fabric 200 may receive a multicast RSCN for forwarding to its connected end devices (or to its connected switches, which may then forward those multicast RSCNs to their connected end devices or connected switch devices, and so on), and those switch devices may be configured to replicate and/or modify the multicast RSCN as needed to perform such forwarding operations. For example, the switch device 206 may receive a multicast RSCN that was generated by the switch device 202 similarly as discussed above, and that must be replicated and/or forwarded to one or more of its connected end devices 208*a-c* that are included in the zone that experienced the change that causes the multicast RSCN to be generated. As such, the database 306 may include a information (e.g., in a forwarding table) that indicates that the multicast RSCN must be replicated and/or modified based on the Zone FCID and/or Multicast MAC address included in those multicast RSCNs.

For example, if the multicast RSCN is provided as part of the FC communication discussed above, the switch device 206 may identify the Zone FCID in its FC communication header, access the database 306 and use that Zone FCID to identify which of the end devices 208*a-c* are included in the zone that experienced the change that resulted in the multicast RSCN, and determine which of those end devices are registered for SCNs. For each of those RSCN-registered devices that are FC devices, the switch device 206 may replicate the FC communication multicast RSCN with the Zone FCID in its FC communication header, and send it to those FC devices. For each of those RSCN-registered devices that are FCoE devices, the switch device 206 may encapsulate the FC communication multicast RSCN with the Zone FCID in its FC communication header in an FCoE communication, add the Multicast MAC address (for the zone that experienced the change that resulted in the multicast RSCN) to the Ethernet header of that FCoE communication, and send it to those FCoE devices.

In another example, if the multicast RSCN is provided as part of the FCoE communication discussed above, the switch device 206 may identify the Multicast MAC address in its Ethernet header, or the Zone FCID in the encapsulated FC communication, access the database 306 and use that Multicast MAC address and/or Zone FCID to identify which of the end devices 208*a-c* are included in the zone that experienced the change that resulted in the multicast RSCN, and determine which of those end devices are registered for SCNs. For each of those RSCN-registered devices that are FCoE devices, the switch device 206 may replicate the FCoE communication multicast RSCN with the Multicast MAC address in its Ethernet header and the encapsulated FC communication, and send it to those FCoE devices. For each of those RSCN-registered devices that are FC devices, the switch device 206 may extract the FC communication that is encapsulated in that FCoE communication and that includes the Zone FCID in its FC communication header, replicate that FC communication, and send it to those FC devices. Similarly as discussed above, the switch device 206 may be configured to send conventional unicast RSCNs (which include the information received in the multicast RSCN) to end devices that are non-multicast-RSCN-compatible. As such, switch devices generating multicast RSCNs may send a single packet including that multicast RSCN to connected switch devices, and have those connected switch device replicate that multicast RSCN, which reduces network traffic associated with the sending of the multicast RSCNs.

With reference back to FIG. 2, in some embodiments, intermediate devices in the fabric 200 may be FSB device that are configured to receive a multicast RSCN for forwarding to its connected end devices, and those FSB devices may be configured to replicate the multicast RSCN as needed to perform such forwarding operations. For example, the intermediate/FSB device 210 may be configured to snoop packets sent to and from the end devices 212*a-c* during the fabric login (FIP) process with the switch device 202, and learn the Multicast MAC addresses assigned to those end devices 212*a-c*. The snooping engine 404 in the intermediate device 210/400 may then generate and/or maintain a table in the database 406 with fields that track the Multicast MAC addresses and Zone FCIDs assigned to the end devices 212*a-c*, and the multicast hardware 408 may be programmed to replicate frames and/or provided with forwarding entries for each Multicast MAC address and the ports on the intermediate/FSB device 210 that are connected to end devices that were assigned those Multicast MAC addresses. For example, such a forwarding table may instruct, for any packet including a destination MAC address that is equal to the Multicast MAC address of "03:FC:00:F0:00:01", the forwarding of that packet to particular ports connected to end devices that were assigned that Multicast MAC address during the fabric login process (e.g., ports 1, 3, and 10). As such, if an FCoE communication providing a multicast RSCN and including the Multicast MAC address "03:FC:00:F0:00:01" is received by the intermediate/FSB device 210, the multicast hardware 408 may use that forwarding table to forward that FCoE communication through the identified ports to the end devices that were assigned that Multicast MAC address during the fabric login process. As such, switch devices generating multicast RSCNs may send a single packet including that multicast RSCN to connected intermediate/FSB devices, and have those connected intermediate/FSB device replicate that multicast RSCN, which reduces network traffic associated with the sending of the multicast RSCNs.

Thus, systems and methods have been described that provide for multicast RSCNs via switch device applications generating a single frame in response to detecting a change associated with a zone in a fabric, and having switch device multicast hardware replicate that single frame and send those replications as multicast RSCNs to other end devices in that zone. As would be appreciated by one of skill in the art in possession of the present disclosure, the provisioning of such multicast RSCNs reduces the number of packets that must be sent by the switch device application. Furthermore, other switch devices and intermediate devices in the fabric may be configured to perform similar functionality by receiving a multicast RSCN from an originating switch device and replicating that multicast RSCN to its connected devices in order to reduce the traffic sent through the fabric.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A registered state change notification system, comprising:
a plurality of end devices; and
a switch device that is coupled to the plurality of end devices to provide a fabric, wherein the switch device is configured to:
detect, using an application executing on the switch device, a change that is associated with a zone in the fabric that includes the plurality of end devices;
generate, using the application and in response to detecting the change associated with the fabric, a multicast Registered State Change Notification (RSCN) that includes a Zone Fibre Channel Identifier (FCID) that is associated with the zone; and
send, using multicast hardware included in the switch device and without the use of the application, the multicast RSCN including the Zone FCID to a at least a subset of the plurality of end devices.

2. The system of claim 1, wherein the at least the subset of the plurality of end devices are Fibre Channel (FC) device(s), and wherein the multicast RSCN is an FC communication that includes the Zone FCID in an FC communication header.

3. The system of claim 2, wherein the switch device is configured to:
assign, in a database during a fabric login process, the Zone FCID to each of the FC device(s) in the zone.

4. The system of claim 1, wherein the switch device is configured to:
generate, using the application and in response to detecting the change that is associated with the zone in the fabric, the multicast RSCN that includes the Zone Fibre Channel Identifier (FCID) and a Multicast Media Access Control (MAC) address that is associated with the zone; and
send, using the multicast hardware included in the switch device and without the use of the application, the multicast RSCN including the Zone FCID and the Multicast MAC address to the at least the subset of the plurality of end devices.

5. The system of claim 4, wherein the at least the subset of the plurality of end devices are Fibre Channel (FC) over Ethernet (FCoE) device(s), and wherein the multicast RSCN is an FCoE communication that includes the Multicast MAC address in an Ethernet header and that encapsulates an FC communication that includes the Zone FCID.

6. The system of claim 5, wherein the switch device is configured to:
assign, in a database during a fabric login process, the Zone FCID and the Multicast MAC address to each of the FCoE device(s) in the zone.

7. An Information Handling System (IHS), comprising:
a multicast hardware;
a processing system coupled to the multicast hardware; and
a memory system that is coupled to the processing system and that includes instructions that, when executed by the processing system, cause the processing system to provide a registered state change notification engine that is configured to:
detect a change that is associated with a zone in a fabric that includes a plurality of end devices; and
generate, in response to detecting the change that is associated with the zone in the fabric, a multicast Registered State Change Notification (RSCN) that includes a Zone Fibre Channel Identifier (FCID) that is associated with the zone,
wherein the multicast hardware is configured to send the multicast RSCN including the Zone FCID to at least a subset of the plurality of end devices.

8. The IHS of claim 7, wherein the at least the subset of the plurality of end devices are Fibre Channel (FC) device(s), and wherein the multicast RSCN is an FC communication that includes the Zone FCID in an FC communication header.

9. The IHS of claim 7, wherein the registered state change notification engine is configured to:
assign, in a database during a fabric login process, the Zone FCID to each of the FC device(s) in the zone.

10. The IHS of claim 9, wherein the registered state change notification engine is configured to:
generate, in response to detecting the change that is associated with the zone in the fabric, the multicast RSCN that includes the Zone Fibre Channel Identifier (FCID) and a Multicast Media Access Control (MAC) address that is associated with the zone,
wherein the multicast hardware is configured to send the multicast RSCN including the Zone FCID and the Multicast MAC address to the at least the subset of the plurality of end devices.

11. The IHS of claim 7, wherein the at least the subset of the plurality of end devices are Fibre Channel (FC) over Ethernet (FCoE) device(s), and wherein the multicast RSCN is an FCoE communication that includes the Multicast MAC address in an Ethernet header and that encapsulates an FC communication that includes the Zone FCID.

12. The IHS of claim 11, wherein the registered state change notification engine is configured to:
assign, in a database during a fabric login process, the Zone FCID and the Multicast MAC address to each of the FCoE device(s) in the zone.

13. The IHS of claim 7, wherein the registered state change notification engine is configured to:
determine, during a fabric login process, that the zone includes a non-multicast-RSCN-compatible end device that is not compatible with multicast RSCNs;
generate, in response to detecting the change that is associated with the zone in the fabric, a unicast Registered State Change Notification (RSCN); and
send the unicast RSCN to the non-multicast-RSCN-compatible end device.

14. A method for providing registered state change notifications, comprising:
detecting, by an application executing on a switch device, a change that is associated with a zone in a fabric that includes a plurality of end devices;
generating, by the application and in response to detecting the change that is associated with the zone in the fabric, a multicast Registered State Change Notification (RSCN) that includes a Zone Fibre Channel Identifier (FCID) that is associated with the zone; and
sending, by multicast hardware included in the switch device and without the use of the application, the multicast RSCN including the Zone FCID to at least a subset of the plurality of end devices.

15. The method of claim 14, wherein the at least the subset of the plurality of end devices are Fibre Channel (FC) device(s), and wherein the multicast RSCN is an FC communication that includes the Zone FCID in an FC communication header.

16. The method of claim 14, further comprising:
assigning, by the application in a database of the switch device during a fabric login process, the Zone FCID to each of the FC device(s) in the zone.

17. The method of claim 14, further comprising:
generating, by the application and in response to detecting the change that is associated with the zone in the fabric, the multicast RSCN that includes the Zone Fibre Channel Identifier (FCID) and a Multicast Media Access Control (MAC) address that is associated with the zone; and
sending, by the multicast hardware included in the switch device and without the use of the application, the multicast RSCN including the Zone FCID and the Multicast MAC address to the at least the subset of the plurality of end devices.

18. The method of claim 14, wherein the at least the subset of the plurality of end devices are Fibre Channel (FC) over Ethernet (FCoE) device(s), and wherein the multicast RSCN is an FCoE communication that includes the Multicast MAC address in an Ethernet header and that encapsulates an FC communication that includes the Zone FCID.

19. The method of claim 14, further comprising:
assigning, by the application in a database of the switch device during a fabric login process, the Zone FCID and the Multicast MAC address to each of the FCoE device(s) in the zone.

20. The method of claim 14, further comprising:
determining, by the application during a fabric login process, that the zone includes a non-multicast-RSCN-compatible end device that is not compatible with multicast RSCNs;
generating, by the application in response to detecting the change that is associated with the zone in the fabric, a unicast Registered State Change Notification (RSCN); and
sending, by the application, the unicast RSCN to the non-multicast-RSCN-compatible end device.

* * * * *